(12) United States Patent
Yu et al.

(10) Patent No.: US 8,149,861 B2
(45) Date of Patent: Apr. 3, 2012

(54) METHOD AND TRANSMISSION APPARATUS FOR TRANSMITTING DATA IN A COAX NETWORK

(75) Inventors: Yang Yu, Beijing (CN); Weizhou Li, Beijing (CN)

(73) Assignee: Hangzhou H3C Technologies Co., Ltd., Hangzhou (CN)

( * ) Notice: Subject to any disclaimer, the term of this patent is extended or adjusted under 35 U.S.C. 154(b) by 109 days.

(21) Appl. No.: 12/537,055

(22) Filed: Aug. 6, 2009

(65) Prior Publication Data

US 2011/0032948 A1 Feb. 10, 2011

Related U.S. Application Data

(63) Continuation of application No. PCT/CN2007/002460, filed on Aug. 15, 2007.

(30) Foreign Application Priority Data

Feb. 7, 2007 (CN) .......................... 2007 1 0006222
Apr. 6, 2007 (CN) .......................... 2007 1 0090420

(51) Int. Cl.
*H04B 7/212* (2006.01)
*G01R 31/08* (2006.01)
(52) U.S. Cl. ........................................ 370/442; 370/252
(58) Field of Classification Search .................. None
See application file for complete search history.

(56) References Cited

U.S. PATENT DOCUMENTS

| 6,018,664 | A  | * | 1/2000  | Skarin ........................... 455/453 |
| 7,187,669 | B1 | * | 3/2007  | Lee ................................ 370/347 |
| 2001/0017864 | A1 | * | 8/2001 | Stobart ........................ 370/442 |
| 2005/0078682 | A1 |   | 4/2005 | Kim et al. |
| 2007/0201698 | A1 | * | 8/2007 | Huh et al. ..................... 380/256 |
| 2008/0062889 | A1 | * | 3/2008 | Azenko et al. ................ 370/252 |
| 2009/0059859 | A1 | * | 3/2009 | Kuze et al. .................... 370/329 |
| 2009/0279565 | A1 | * | 11/2009 | Kamath et al. ................ 370/442 |
| 2010/0031303 | A1 | * | 2/2010 | Yu et al. ........................ 725/116 |

FOREIGN PATENT DOCUMENTS

| CN | 1184390 A | 6/1998 |
| CN | 1504034 A | 6/2004 |
| CN | 1897591 A | 1/2007 |

* cited by examiner

*Primary Examiner* — Kwang B Yao
*Assistant Examiner* — Jutai Kao
(74) *Attorney, Agent, or Firm* — Marshall, Gerstein & Borun LLP

(57) ABSTRACT

A method and apparatus for transmitting data in a coax network, a coax distribution network including an access point and a plurality of coaxial terminals connected to the access point through splitters, a same physical transmission channel is adopted for transmitting uplink data and downlink data between the access point and each coaxial terminal in the coax distribution network, the method including: Step S1: dividing an entire time duration of a physical transmission channel for transmitting information into time slices to constitute an uplink data transmission channel and a downlink data transmission channel; and Step S2: transmitting uplink data and downlink data between the Ethernet access point and each coaxial terminal at different time slices respectively. The present invention is based on a reconstruction of the Ethernet physical layer of the coax distribution network, where the uplink data and the downlink data are transmitted on the same physical transmission channel by adopting a time division multiplexing method, and MPCP protocol is adopted on the uplink for realizing a MAC layer communications between the Ethernet access point and the plurality of coaxial terminals.

22 Claims, 6 Drawing Sheets

METHOD AND TRANSMISSION APPARATUS FOR TRANSMITTING DATA IN A COAX NETWORK

CROSS-REFERENCE TO RELATED APPLICATION

This is a continuation of International Application No. PCT/CN2007/002460, filed Aug. 15, 2007, which claims the priority benefit of Chinese Patent Application No. 200710006222.4, filed Feb. 7, 2007, and Chinese Patent Application No. 200710090420.3, filed Apr. 6, 2007, the entire respective disclosures of which are incorporated herein by reference.

FIELD OF THE INVENTION

The present invention relates to network communications, and particularly to a new method and transmission apparatus of a bidirectional data transmission in a coax distribution network.

BACKGROUND OF THE INVENTION

In a conventional fiber coaxial network (HFC) of a Community Antenna Television (CATV), TV programs from the front are transmitted to optical nodes around subscribers in a TV network via fibers (under normal circumstances, an optical node covers 300 to 500 subscribers around). TV signals are converted from optical signals to electrical signals at the optical node, and then transmitted to residents' homes through a coax distribution network and via residential buildings.

Please refer to FIG. 1, which is a diagram illustrating the structure of a network from the access point to coaxial terminals in a conventional CATV coax distribution network. As shown in FIG. 1, the system includes an Ethernet access point, 36 splitters (e.g., #11 and #61) and 72 coaxial terminals (e.g., #111 and #612). The television signal output from the Ethernet access point, after being amplified by a building amplifier, passes through a six-branch distributor which distributes the energy of the television signal evenly to six units of the building, and then at each floor of each unit, the television signal is distributed to two residential homes (i.e., two coaxial terminals) through a two-branch splitter.

With the growth of demand on new bidirectional transmission services (for example, interactive digital television, broadband services such as data, voice, video and other multimedia communications implemented in a CATV network), the CATV network, which is only capable of transmitting signals in one direction, needs to carry out bidirectional services. A primary problem encountered is bidirectional reconstruction, which is a threshold to be stride when the CATV network is required to develop from a single function to multi-functions and from a radio and television network to an information network.

At present, a typical application is a bidirectional HFC network obtained by bidirectional reconstruction, which is realized by an asymmetrical frequency division for uplink and downlink. At the front, various service signals, such as analog television signals, digital video signals, computer data signals, telephone signals and various control signals etc., are modulated into different channels of downlink frequency segments in a Sub-Carrier Multiplexing (SCM) mode, and then are transmitted to an optical node via optical fibers after an electronic-to-optic conversion, and the service signals at the optical node are transmitted to subscribers via a coax in a broadcasting mode after an optic-to-electronic conversion. Subscribers' uplink signals are multiplexed into an uplink physical transmission channel by adopting a multiple access technology (e.g., Frequency Division Multiple Access, FDMA for short) and are transmitted to an optical node via a coax for an electronic-to-optic conversion, and then the uplink signals are transmitted to the front via optical fibers. However, the costs of such bidirectional reconstruction are relatively high overall, and the average costs of each residential home's reconstruction are about 300 Yuan. In addition, the major costs are on the bidirectional reconstruction of data transmission implemented on the last 100 meters near the end subscriber in the coax distribution network.

As well known, Ethernet has advantages of being simple, low cost and easy to extend, and if it is possible to apply the present mature Ethernet bidirectional data transmission technology directly to the existing coax distribution network, the costs of the reconstruction for bidirectional data transmission in the coax distribution network can be reduced significantly without doubt. However, the coax distribution network is in a point-to-multipoint physical/logical topology structure while the conventional Ethernet is based on a point-to-point protocol and adopts a base-band transmission manner, therefore, if the Ethernet is adopted to implement the reconstruction for bidirectional data transmission on the last one hundred meters of the existing HFC networks, it is necessary to solve the following three technical problems:

1) The existing physical layer technique is to be improved, i.e., without changing the architecture of the existing CATV coax distribution network, to make a signal source of an Ethernet access point communicate with each coaxial terminal while the coaxial terminals not communicate with each other.

2) How to adopt the Ethernet technology to transmit a point-to-point Ethernet protocol in a point-to-multipoint coax distribution network.

3) The same physical transmission channel is adopted to transmit both downlink data and uplink data.

Regarding the second problem mentioned above, the technical problem of how to transmit the point-to-point Ethernet protocol in the coax distribution network having a point-to-multipoint physical/logical topology can be resolved successfully if it is possible to apply architecture of an Ethernet over Passive Optical Network (EPON for short) in the coax distribution network.

The EPON system is a bidirectional dual-fiber optical access network adopting a Point-to-Multipoint (P-to-MP for short) structure, which includes an Optical Line Terminal (OLT for short) at network side, Optical Network Units (ONU for short) and an Optical Distribution Network (ODN for short). And EPON is located between a Service Network Interface (SNI for short) and a User Network Interface (UNI for short), and is connected with a user device through the UNI.

Please refer to FIG. 2, which is a diagram illustrating the architecture of an EPON system. As shown in FIG. 2, a typical EPON system consists of an OLT, a plurality of ONUs (ONU #1, ONU #2, ..., and ONU #n) and a Passive Optical Splitter (POS for short). The OLT is located in a Central Office (CO for short) at network side, and the ONU is located in a corridor or a user's home, where the OLT and the ONU is connected with each other via a POS. The POS is adapted to distribute downlink data and collect uplink data.

According to the EPON technology, data are transmitted in a broadcasting mode on the downlink and in a time division multiplexing mode on the uplink. The uplink and the downlink belong to different optical-fiber physical transmission channels, and data transmission on the uplink and that on the downlink can be performed simultaneously. In a downlink direction (from an OLT to ONUs), the signal sent from the OLT reaches each ONU via a 1:n passive splitter (or via several cascade splitters). And in an uplink direction (from an ONU to an OLT), the signal sent from one ONU can reach the OLT only and can not reach any other ONU.

In the physical (PHY) layer of the EPON, 1000 BASE Ethernet PHY is adopted, and at the same time, new Media Access Control (MAC for short) commands are added to the EPON transmission mechanism in order to control and optimize the bursting data transmission and real-time Time Division Multiplex and Multiplexer (TDM for short) communications between each ONU and the OLT. In the second protocol layer of the EPON, the mature full-duplex Ethernet technology is adopted as well as the TDM technology, where no conflict will happen and Carrier Sense Multiple Access/ Conflict Detection (CDMA/CD) is not necessary since the ONU sends packets within its own time slot, and thereby the bandwidth is fully utilized.

Specifically, the EPON, compared with the traditional Ethernet, mainly further includes two functions: a simulation sub-layer located under the MAC layer and Multi-Point Control Protocol (MPCP for short) which is regarded as a part of the MAC layer.

Please refer to FIG. 3, which shows a relationship between EPON protocol layers and an Open System Interconnect (OSI) reference model. A simulation sub-layer makes the point-to-multipoint network below look like a plurality of point-to-point links when seen from an upper protocol layer, which is achieved by adding a Logic Link Identity (LLID) as a substitute of a two-byte leading code at the beginning of each group. In the EPON, an optical signal can be accurately transmitted to the end user, and the data from the end user can be transmitted to the central network without adopting any complicated protocol. The MPCP control protocol acts as an extension of the MAC control sub-layer in order to support the normal operation of the communications between the OLT and multiple ONUs in the EPON system, where the ONUs' MAC addresses are identified by their respective LLIDs which are dynamically allocated in their registration procedure.

The MPCP control protocol provisions three procedures:

1) A Discovery Procedure:

Please refer to FIG. 4, which shows a flow chart for discovering an ONU and completing the ONU's registration according to the MPCP control protocol. As shown in FIG. 4, when the system has just been on power, an OLT sends a broadcasting message, all of the ONUs having been on power will receive the message, and each ONU receiving the message will send to the OLT a message to inform the OLT its own information such as ID etc. The OLT will know which ONUs in the system are in an on-power working state on after receiving the registration messages sent from all the ONUs on power.

2) A Report Processing Procedure:

This processing procedure is to complete the collection and generation of all kinds of report information via an uplink bandwidth request sent from the ONU to the OLT. Specifically, as each ONU will report which traffic is to be transmitted, the OLT can know the status of all the ONUs that wait for traffic transmission, and after comprehensive consideration and scheduling, the OLT will allocate a corresponding transmission time slot for each ONU via the following threshold processing message and guarantee that the transmission time slots of multiple ONUs do not conflict with each other. And thus, the multiple ONUs is able to share the same uplink physical transmission channel without any conflict between each other.

3) A Threshold Processing Procedure:

This processing procedure is to accomplish the collection and generation of management threshold information through multi-path transmission of a multiplexer. Specifically, the OLT allocates different transmission time slots to multiple ONUs, and each ONU sends out traffic data that to be transmitted to the OLT at the designated time slot allocated by the OLT. In this way, more than one ONU is able to share the same uplink physical transmission channel without any conflict between each other.

To sum up, according to the above EPON MPCP protocol, a physical transmission channel is in use when an OLT sends data (downlink) to an ONU while another physical transmission channel is in use when the ONU sends data (uplink) to the OLT. For example, an uplink channel is an optical fiber while a downlink channel is another optical fiber, and the two physical transmission channels are two separate physical optical fibers, thereby no interference exists between them and they can be in use simultaneously.

However, compared with the EPON system adopting a bidirectional dual-fiber optical access network in a point-to-multipoint structure, in the point-to-multipoint physical and logical topology of the access point and coaxial terminals in a coax network environment, the same physical transmission channel is adopted to transmit uplink data and downlink data. Therefore, the problem of the uplink and the downlink sharing one physical transmission channel is necessary to be resolved if the MPCP protocol is required to be applied in the coax network environment.

SUMMARY OF THE INVENTION

An object of the present invention is to transmit uplink data and downlink data on a same physical transmission channel by adopting a time division multiplexing method based on the reconstruction of the Ethernet physical layer of the point-to-multipoint coax distribution network, and to realize MAC layer communications between an Ethernet access point and a plurality of coaxial terminals on the uplink by adopting an Ethernet MAC layer protocol similar to the MPCP protocol.

In view of the above object, the present invention provides a method for transmitting data in a coax network to implement uplink data and downlink data transmission on a same physical transmission channel between an access point and each coaxial terminal in a coax distribution network, and the method includes:

Step S1: dividing an entire time duration of a physical transmission channel for transmitting information into time slices to constitute an uplink data transmission channel and a downlink data transmission channel; and Step S2: transmitting uplink data and downlink data between the access point and each coax terminal at different time slices respectively.

In accordance with the method for transmitting data in the coax network, Step S1 specifically includes:

Step S1-1: organizing all the time slices of the physical transmission channel for transmitting information into two time slots, one for uplink data transmission and the other for downlink data transmission; and Step S1-2: dividing the time slot for uplink data transmission into a plurality of sub-slots, different coaxial terminals that needs to transmit uplink data transmitting the uplink data at different sub-slots.

In accordance with the method for transmitting data in the coax network, the length of the sub-slot is shorter than or equal to the length of a period that the coaxial terminal maintains a synchronized clock.

In accordance with the method for transmitting data in the coax network, the length of the time slot for downlink data transmission are multiples of the length of the period.

In accordance with the method for transmitting data in the coax network, Step S2 specifically includes:

Step S2-1: transmitting, by the access point, data to each coaxial terminal at the time slot for downlink data transmission in a broadcasting mode; and Step S2-2: transmitting, by each coaxial terminal that needs to transmit uplink data, data to be received by the access point at different sub-slots for uplink data transmission.

In accordance with the method for transmitting data in the coax network, Step S2-2 specifically includes:

Step S2-2-1: discovering coaxial terminals and completing on-power registration for each coaxial terminal discovered;

Step S2-2-2: collecting status of all the coaxial terminals that wait for traffic transmission according to uplink bandwidth requests sent from the coaxial terminals, and allocating sub-slots for uplink data transmission to the coaxial terminals that need to transmit uplink data; and Step S2-2-3: transmitting, by each coaxial terminal, data to be transmitted to the access point at its respective sub-slots allocated for uplink data transmission.

In accordance with the method for transmitting data in the coax network, Multi-Point Control Protocol (MPCP) control protocol is adopted in the media access control layer of the coaxial terminal for controlling uplink data transmission when the coaxial terminal transmits uplink data to the access point.

The present invention also provides a transmission apparatus for transmitting data in a coax network, wherein the coax network includes an access points and a plurality of coaxial terminals connected with the access point through splitters, and a same physical transmission channel is adopted for transmitting uplink data and downlink data between the access point and each coaxial terminal in the coax network, the apparatus includes: a network bandwidth allocation module, connected with the access point and each of the coaxial terminals in the coax network, adapted for allocating bandwidth of a same physical transmission channel for uplink data transmission and downlink data transmission by adopting a time division multiplexing method.

In accordance with the transmission apparatus, the network bandwidth allocation module includes: a configuration module, adapted for organizing time slices of the physical transmission channel for transmitting information into time slots for uplink data transmission and downlink data transmission to constitute an uplink data transmission channel and a downlink data transmission channel; and a transmission control module connected with the configuration module and located between the access point and the plurality of coaxial terminals, adapted for controlling uplink data transmission and downlink data transmission between the access point and each coaxial terminal occupy different time slices.

In accordance with the transmission apparatus, the configuration module includes: an uplink/downlink time slot allocation module, adapted for organizing the time slices of the physical transmission channel for transmitting information into two time slots to constitute the uplink data transmission channel and the downlink data transmission channel; and an uplink sub-slot allocation module, adapted for dividing the time slot for uplink data transmission into a plurality of sub-slots, different coaxial terminals that needs to transmit uplink data transmitting the uplink data at different sub-slots.

In accordance with the transmission apparatus, the transmission control module includes: a downlink data transmission control module, adapted for making the access point transmit data to each coaxial terminal at the time slot for downlink data transmission in a broadcasting mode; and an uplink data transmission control module, adapted for controlling each coaxial terminal that needs to transmit uplink data transmit data to be received by the access point at different sub-slots for uplink data transmission.

In accordance with the transmission apparatus, the uplink data transmission control module includes: a registration module, adapted for discovering coaxial terminals and completing on-power registration for each coaxial terminal discovered; a report processing module, adapted for collecting the status of all the coaxial terminals that wait for traffic transmission according to uplink bandwidth requests sent from the coaxial terminals, and allocating sub-slots for uplink data transmission to the coaxial terminals that need to transmit uplink data; and a transmission processing module, adapted for making each coaxial terminal transmit data that needs to be transmitted to the access point at its respective sub-slots allocated for uplink data transmission.

In accordance with the transmission apparatus, the uplink data transmission control module is located in a Media Access Control (MAC) layer chip of the access point and/or each coax terminal to control the MAC layer to make the MAC layer transmit the uplink data from each coaxial terminal to the access point by adopting Multi-Point Control Protocol (MPCP) protocol.

The present invention further provides a coax network comprising an access point and a plurality of coaxial terminals connected with the access point through splitters, wherein a same physical transmission channel is adopted to transmit uplink data and downlink data between the access point and each coaxial terminal in the coax network, and the coax network further includes a data transmission apparatus, which includes: a network bandwidth allocation module connected with the access point and each of the coaxial terminals in the coax network, adapted for allocating bandwidth of a same physical transmission channel for uplink data transmission and downlink data transmission by adopting a time division multiplexing method.

In accordance with the coax network, the network bandwidth allocation module includes: a configuration module, adapted for organizing time slices of the physical transmission channel for transmitting information into time slots for uplink data transmission and downlink data transmission to constitute an uplink data transmission channel and a downlink data transmission channel; and a transmission control module connected with the configuration module and located between the access point and the plurality of coaxial terminals, adapted for controlling uplink data transmission and downlink data transmission between the access point and each coaxial terminal occupy different time slices.

The present invention also provides a coaxial terminal connected with an access point through a network bandwidth allocation module to compose a coax network, wherein a same physical transmission channel is adopted to transmit uplink data and downlink data between the access point and each coaxial terminal in the coax network, and the coaxial terminal includes: an uplink data transmission sub-slot receiving module, adapted for receiving sub-slots for uplink data transmission transmitted by the network bandwidth allocation module; and an uplink data transmitting module, adapted for transmitting to the network bandwidth allocation module uplink data that need to be transmitted at the sub-slots for uplink data transmission.

In accordance with the coaxial terminal, the coaxial terminal further includes a registration information transmitting module, adapted for transmitting registration information to the network bandwidth allocation module.

In accordance with the coaxial terminal, the coaxial terminal further comprises: a bandwidth request transmitting module, adapted for transmitting a bandwidth request to the network bandwidth allocation module.

It can be seen from the above-mentioned technical schemes that in accordance with the present invention, uplink data and downlink data are transmitted on the same physical transmission channel by adopting a time division multiplexing method based on the transformation for the Ethernet physical layer in the coax distribution network, and the MPCP control protocol is adopted on the uplink to realize the MAC layer communications between the Ethernet access point to multiple coaxial terminals. Thus, it is possible to transmit Ethernet base-band electronic signals based on the existing tree-structured coax network, so that great chances can be created for developing broadcasting value-added services and adding values to the existing network resources, and particularly, such transformation for the bidirectional transmission costs very low.

EMBODIMENTS OF THE INVENTION

The basis for implementing the present invention is to realize that a signal source of an Ethernet access point and each coaxial terminal can communicate with each other while the coaxial terminals can not communicate with each other by means of reconstructing the Ethernet physical layer without changing the architecture of the existing CATV coax distribution network, in order to support point-to-multipoint transmission of Ethernet protocol on the existing coax distribution network.

The method and transmission apparatus supporting Ethernet transmission in the coax distribution network in accordance with embodiments of the present invention is described in detail hereinafter with accompanying of the drawings.

Figure 1:
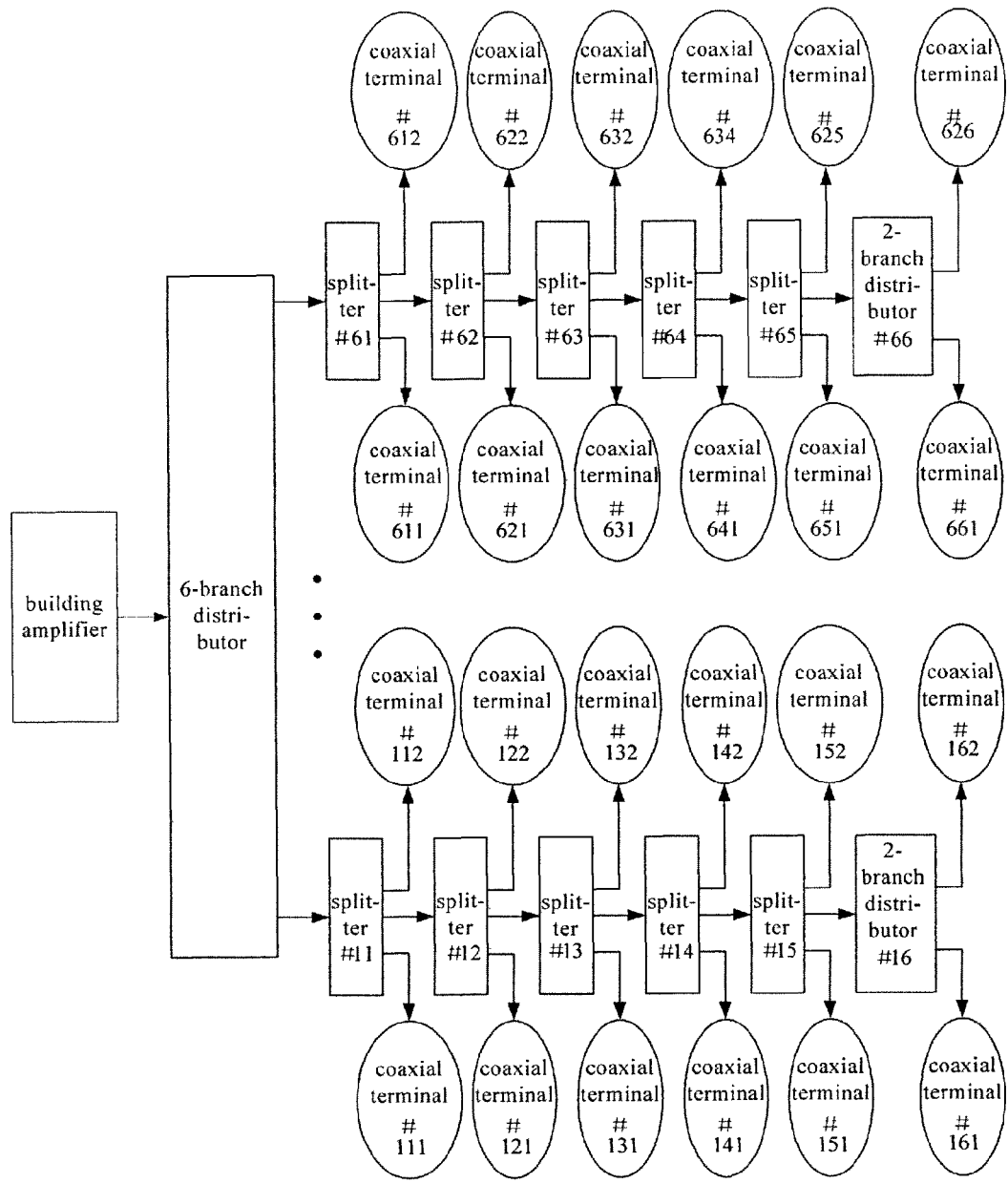
FIG. 1 is a diagram illustrating the structure of a network from the access point to coaxial terminals in a conventional CATV coax distribution network.
Figure 2:
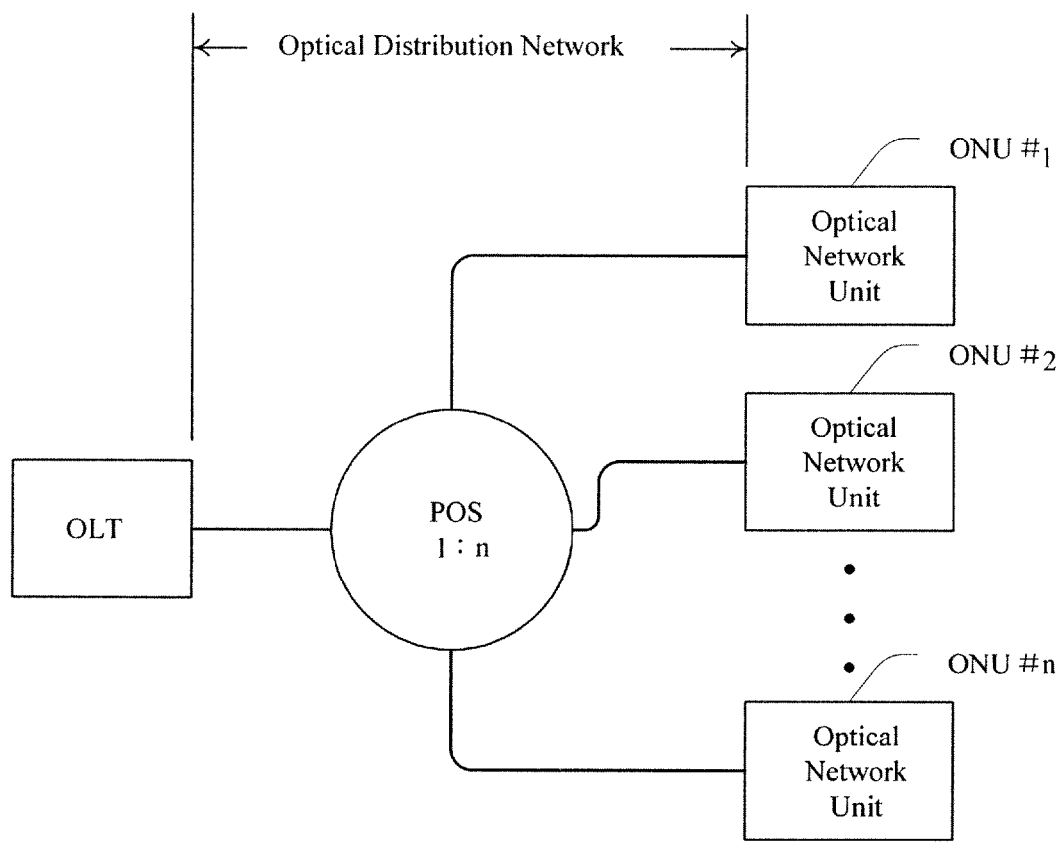
FIG. 2 is a diagram illustrating the architecture of an existing EPON system.
Figure 3:
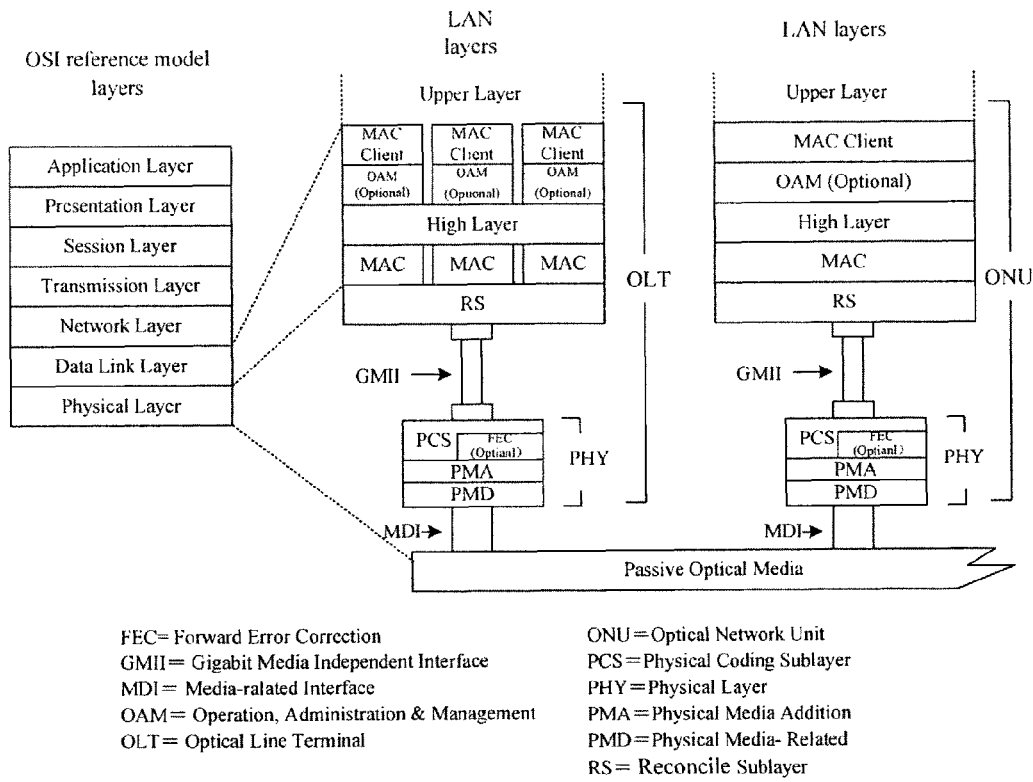
FIG. 3 is a diagram illustrating a relationship between EPON protocol layers and an OSI reference model in the prior art.
Figure 4:
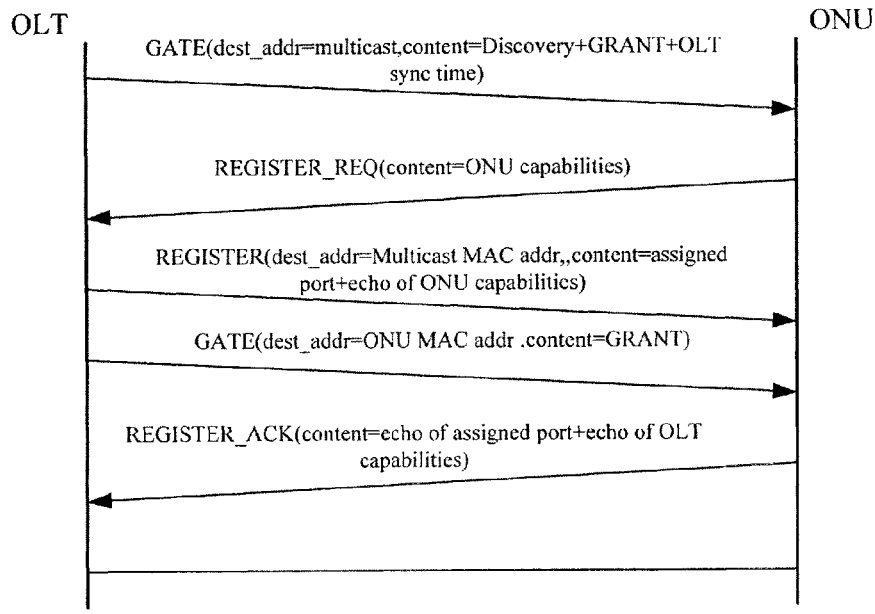
FIG. 4 is a flow chart of a procedure for discovering an ONU and completing the ONU's registration according to MPCP control protocol in the prior art.
Figure 5:
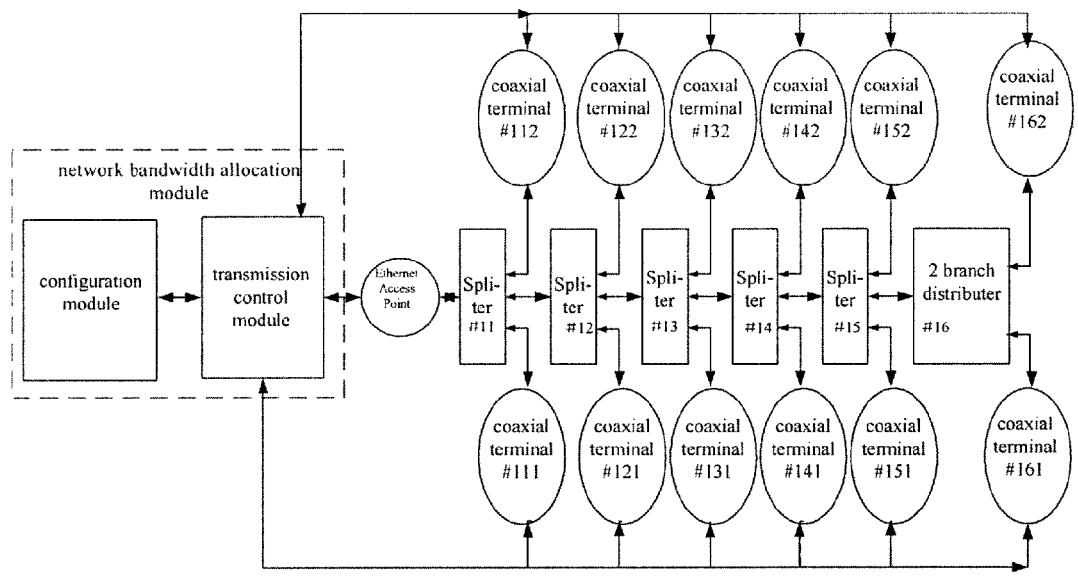
FIG. 5 is a diagram illustrating a partial structure of an Ethernet transmission system in a coax distribution network in accordance with an embodiment of the present invention.

First of all, please refer to FIG. 5, which is a diagram illustrating a structure of an Ethernet transmission system in a coax distribution network in accordance with an embodiment of the present invention.

FIG. 5 shows a partial structure of the Ethernet transmission system in the coax distribution network in accordance with the embodiment of the present invention, which includes an Ethernet access point and six splitters (#11, #12, #13, #14, #15, #16) as well as twelve coaxial terminals (#111, #112, #121, #122, #131, #132, #141, #142, #151, #152, #161, #162). As one physical transmission channel is adopted to transmit both uplink data and downlink data between the Ethernet access point and each coaxial terminal in the coax distribution network, i.e., the same physical transmission channel is adopted to transmit data on both uplink and downlink, a network bandwidth allocation module is added in the coax distribution network, and the network bandwidth allocation module is connected respectively with the access point and the multiple coaxial terminals in the coax distribution network, and is adapted to allocate bandwidth for the uplink data and the downlink data transmitted on the same physical transmission channel by adopting a time division multiplexing method. That is to perform time division multiplexing communication for the data that need to be transmitted so that each branch of signal transmitted between the Ethernet access point and the coaxial terminals are transmitted on the same physical transmission channel at different time slots.

Figure 6:
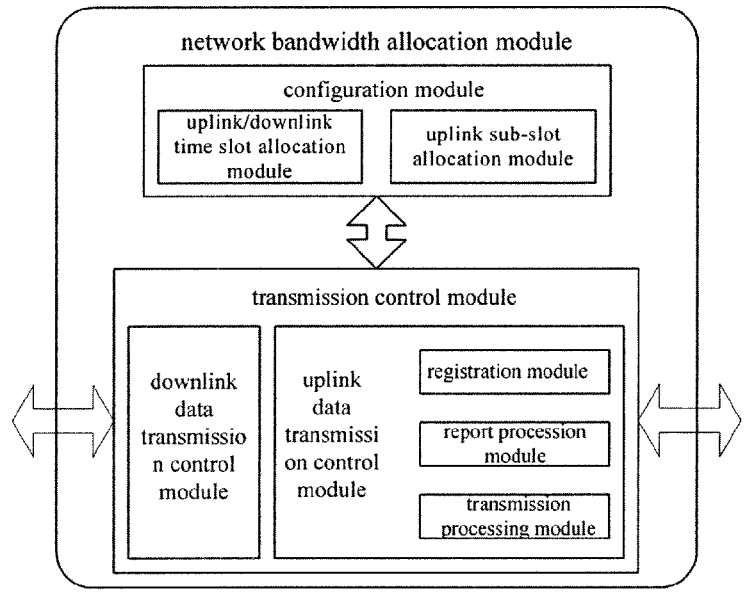
FIG. 6 is a diagram illustrating a structure of a network bandwidth allocation module in accordance with an embodiment of the present invention.

Please referring to FIG. 6, which is a diagram illustrating a structure of a network bandwidth allocation module in accordance with an embodiment of the present invention. The network bandwidth allocation module shown in FIG. 6 may be regarded as a preferred embodiment of the present invention, that is to add a network bandwidth allocation module to the existing cable television coax distribution network. The network bandwidth allocation module includes a configuration module and a transmission control module, where, the configuration module is adapted for organizing all the time slices of the physical transmission channel for transmitting information into a plurality of time slots for uplink data transmission and downlink data transmission, to constitute an uplink data transmission channel and a downlink data transmission channel; and the transmission control module is connected with the configuration module and located between the access point and the plurality of coaxial terminals, and is adapted for controlling the uplink data transmission and the downlink data transmission between the access point and each coaxial terminal occupy different time slices.

In the embodiment, the configuration module and the transmission control module defines a control mechanism to guarantee effective data transmission and reception between the Ethernet access point and the coaxial terminals. Preferably, the configuration module and the transmission control module may be configured in a Media Access Control (MAC) layer chip of the Ethernet access point and/or each coaxial terminal to conveniently control the MAC layer so that the MAC layer can transmit the uplink data from the coaxial terminals to the Ethernet access point adopting a protocol similar to the MPCP protocol.

Specifically, the configuration module further includes an uplink/downlink time slot allocation module and an uplink sub-slot allocation module. The uplink/downlink time slot allocation module is adapted for organizing all the time slices of the physical transmission channel for transmitting information into two time slots for uplink data transmission and downlink data transmission to constitute the uplink data transmission channel and the downlink data transmission channel. When the system is running, data transmission is only permitted on one of the uplink and the downlink at any time. The device of the access point occupies the time slot for downlink data transmission among the downlink time slices in transmitting data to each coaxial terminal in a broadcasting mode. The uplink sub-slot allocation module is adapted for dividing the time slot for uplink data transmission among the uplink time slices into a plurality of sub-slots so that the coaxial terminals that need to transmit uplink data transmit uplink data at different sub-slots.

The transmission control module includes a downlink data transmission control module and an uplink data transmission control module. On the downlink, the downlink data transmission control module is adapted for making the device of the Ethernet access point transmit data to each coaxial terminal at the time slot for downlink data transmission in a broadcasting mode. And on the uplink, the uplink data transmission control module is adapted for controlling coaxial terminals that need to transmit uplink data so that the coaxial terminals transmit data that need to be received by the Ethernet access point respectively at different sub-slots for uplink data transmission, thereby at any time of the uplink time slices, only one coaxial terminal is permitted to transmit data to the Ethernet access point. And thus, conflicts between information packets from different coaxial terminals can be avoided.

The uplink data transmission control module further includes a registration module, a report processing module and a transmission processing module. The registration module is adapted for making the device of the Ethernet access point discover each coaxial terminal and complete the on-power registration for each coaxial terminal. The report processing module is adapted for making the device of the Ethernet access point collect status of all the coaxial terminals that wait for traffic transmission according to uplink bandwidth requests sent from the coaxial terminals and distribute different sub-slots for uplink data transmission to the coaxial terminals that need to transmit uplink data. The transmission processing module is adapted for making the coaxial terminals transmit data that need to be transmitted to the Ethernet access point at their respective sub-slots for uplink data transmission which are allocated by the device of the Ethernet access point. Accordingly, the coaxial terminal connected with the network bandwidth allocation module includes a registration information transmitting module, a bandwidth request transmitting module, an uplink data transmission sub-slot receiving module and an uplink data transmitting module. The registration information transmitting module is adapted for transmitting registration information to the network bandwidth allocation module. The bandwidth request transmitting module is adapted for transmitting a bandwidth request to the network bandwidth allocation module. The uplink data transmission sub-slot receiving module is adapted for receiving a sub-slot for uplink data transmission transmitted by the network bandwidth allocation module. And, the uplink data transmitting module is adapted for transmitting uplink data that need to be transmitted to the network bandwidth allocation module at the sub-slot for uplink data transmission.

It can be seen from the above that the Ethernet transmission system in the coax distribution network as shown in FIG. 5 is implemented by transforming the Ethernet physical layer of the Point-to-Multipoint coax distribution network and adding a network bandwidth allocation module as shown in FIG. 6 to the MAC layer chips of the Ethernet access point and each coaxial terminal. The Ethernet transmission system transmits both the uplink data and the downlink data on the same physical transmission channel by adopting a time division multiplexing method, and realizes the MAC layer communications between the Ethernet access point and multiple coaxial terminals by adopting an Ethernet MAC layer protocol similar to the MPCP protocol.

The Ethernet transmission method in the coax distribution network in accordance with the present invention is described in detail hereinafter with accompanying of FIGS. 5, 6 and 7.

Figure 7:
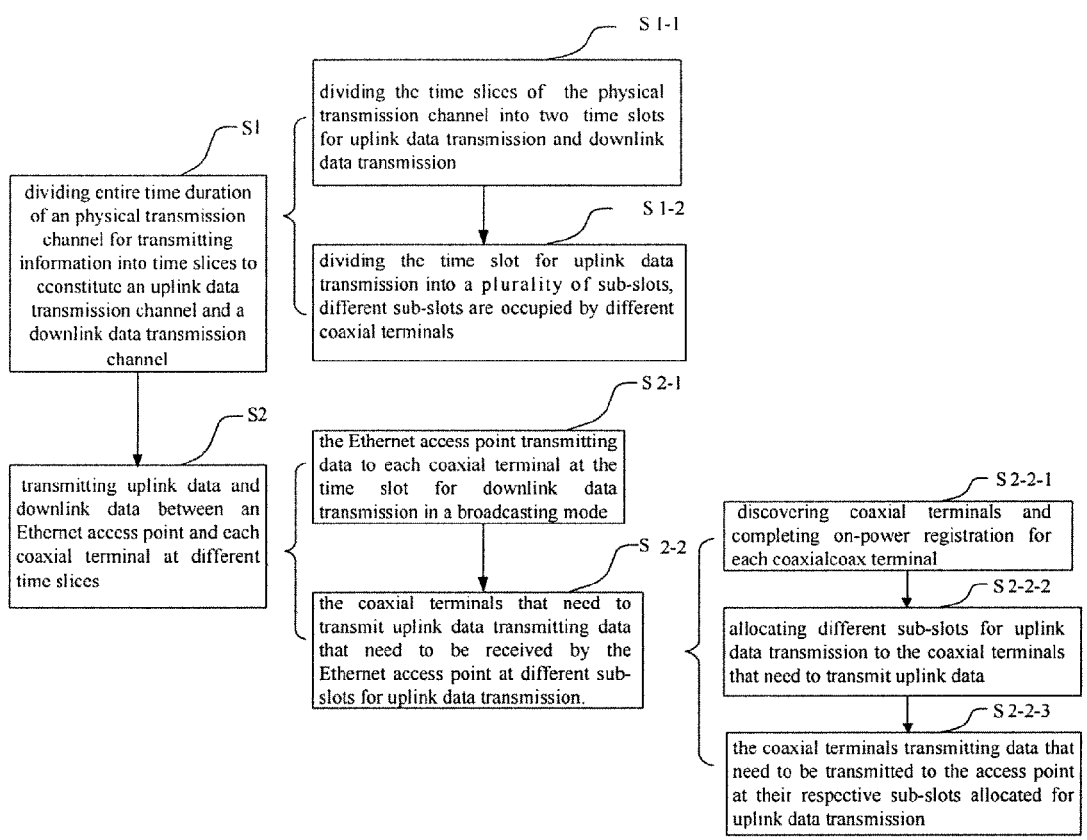
FIG. 7 is a flow chart illustrating an Ethernet transmission method in a coax distribution network in accordance with an embodiment of the present invention; and, FIG. 8 is a flow chart in accordance with another embodiment of the present invention.

Please refer to FIG. 7, which is a flow chart illustrating an Ethernet transmission method in a coax distribution network in accordance with an embodiment of the present invention. As shown in FIG. 7, the method includes:

Step S1: dividing entire time duration of a physical transmission channel for transmitting information into time slices to constitute an uplink data transmission channel and a downlink data transmission channel; and Step S2: transmitting uplink data and downlink data between an Ethernet access point and each coaxial terminal at different time slices respectively.

In other words, when the same physical transmission channel is adopted for transmitting both the uplink data and the downlink data between the Ethernet access point and each coaxial terminal in the coax distribution network, if the entire time duration for transmitting information of the physical transmission channel is divided into several time slices (slots) and these time slots are allocated to each signal source, each branch of signal can have a monopoly of the physical transmission channel for transmitting data at its own time slot so that the object of separating the transmission channel without interference can be achieved. The access point occupies the time slot for downlink data transmission among the downlink time slices to transmit data to each coaxial terminal in a broadcasting mode, and the uplink sub-slot allocation module divides the time slot for uplink data transmission among the uplink time slices into a plurality of sub-slots so that the coaxial terminals that need to transmit uplink data can transmit uplink data at different sub-slots.

As shown in FIG. 7, the specific operation procedure of Step S1 includes:

Step S1-1: organizing all the time slices of the physical transmission channel for transmitting information into two time slots respectively for uplink data transmission and downlink data transmission; and Step S1-2: dividing the time slot for uplink data transmission into a plurality of sub-slots, wherein different coaxial terminals that need to transmit uplink data occupy different sub-slots to transmit the uplink data.

After performing Step S1, the Ethernet access point in FIG. 5 can start adopting downlink data transmission channels to transmit data to the coaxial terminals (e.g., #121, #162), and the coaxial terminals that need to transmit data (e.g., #121, #162) can also start sharing the uplink data transmission channel to transmit data.

Similarly, as shown in FIG. 7, the specific operation procedure of Step S2 includes:

Step S2-1: the Ethernet access point transmitting data to each coaxial terminal at the time slot for downlink data transmission in a broadcasting mode; and Step S2-2: the coaxial terminals that need to transmit uplink data transmitting data that need to be received by the Ethernet access point at different sub-slots for uplink data transmission.

In Step S2, the uplink data and the downlink data are transmitted on different time transmission channels, so that the uplink data transmission and the downlink data transmission can be performed between the Ethernet access point and each coaxial terminal (e.g., #121, #162).

It should be noted that the number of the time slices occupied by the uplink/downlink data transmission channel and the length of the time slice can be assigned in unity as needed. And particularly, the number of the sub-slots occupied by an uplink data transmission sub-channel and the length of the sub-slot may be assigned dynamically according to the number of the coaxial terminals and the bandwidth they need. For example, if a coaxial terminal (#121) has just got offline or two coaxial terminals (#132 and #141) have just completed the on-power registration, the number of the coaxial terminals that are registered in the network will change, which directly leads to an increase or a decrease of the number of the sub-slots needed, and subsequently, and thus the transmission control module in FIG. 5 will re-assign the number of the sub-slot occupied by the uplink data transmission sub-channel and the length of the sub-slot.

Similarly, as shown in FIG. 7, the specific operation procedure of Step S2-2 includes Step S2-2-1, Step S2-2-2 and Step S2-2-3.

In Step S2-2-1, the device of the Ethernet access point discovers coaxial terminals and completes on-power registration for each coaxial terminal. Specifically, when the system is just on power, the Ethernet access point transmits a broadcasting message, so that all the coaxial terminals on power and being registered will receive the message. Each coaxial terminal receiving the message will transmit to the Ethernet access point a message to inform the Ethernet access point of its own ID information etc. The Ethernet access point will know which coaxial terminal inside the system is in an on-power working state after receiving the registration messages from all the coaxial terminals on power.

In Step S2-2-2, the Ethernet access point collects status of all the coaxial terminals that wait for traffic transmission according to uplink bandwidth requests sent from the coaxial terminals, and allocates different sub-slots for uplink data transmission to the coaxial terminals that need to transmit uplink data. Specifically, each coaxial terminal reports which traffic is waiting for transmission, so that the Ethernet access point will know the status of all the coaxial terminals that wait for traffic transmission, and after comprehensive consideration and scheduling, the Ethernet access point will allocate a transmitting time slot to a corresponding coaxial terminal and make the transmitting time slot of a coaxial terminals not conflict with one another, thereby, it can be realized that a plurality of coaxial terminals share the same uplink physical transmission channel without conflicts.

In Step S2-2-3, the coaxial terminals transmit data that need to be transmitted to the access point at their respective sub-slots for uplink data transmission which are allocated by the Ethernet access point. Specifically, the Ethernet access point allocates different transmission time slots to the plurality of coaxial terminals, and each coaxial terminal transmits traffic that need to be transmitted to the Ethernet access point at its own designated time slot allocated by the Ethernet access point. And thus, the plurality of coaxial terminals can share the same uplink physical transmission channel without conflicts.

Preferably, when a coaxial terminal is transmitting uplink data to the Ethernet access point, the MPCP protocol may be adopted in the MAC layer of the coaxial terminal in order to control transmission of the uplink data. The contents of the MPCP protocol involve transmission time slots allocation for coaxial terminals, coaxial terminals automatic discover and addition, congestion status report to the upper layer for dynamic bandwidth allocation. The above-mentioned contents belong to the prior art and will not be discussed hereinafter.

Additionally, it is necessary to keep the clock of each coaxial terminal being synchronized with that of the Ethernet access point in order to guarantee a normal data transmission between each coaxial terminal and the Ethernet access point in the embodiment of the present invention. However, the ability of each coaxial terminal for maintaining a synchronized clock is limited, and usually, it can guarantee the accuracy of its own clock only within a period from ten millisecond to hundreds millisecond. If a coaxial terminal can not receive clock information sent from the Ethernet access point within the period that the synchronized clock is maintained, there will be an error in the clock of the coaxial terminal, that is, the clock of the coaxial terminal will be not synchronized with that of the Ethernet access point, and as a result, the coaxial terminal and the Ethernet access point can not transmit data normally.

Specifically, the Ethernet access point and the coaxial terminals occupy the transmission channel at different time in the embodiment of the present invention. That is to say, the Ethernet access point can not transmit any information at the uplink time slot, i.e., the coaxial terminal can not receive any clock information from the Ethernet access point at the uplink time slot. On the other hand, the ability of the coaxial terminal for maintaining a synchronized clock is limited, so there will be errors in the coaxial terminal's clock if the period that the coaxial terminal does not receive the clock information from the Ethernet access point is longer than the period that the coaxial terminal maintains a synchronized clock.

It can be seen from the characters mentioned above, the coaxial terminal is able to guarantee that its own clock is kept not only accurate but also being synchronized with the clock of the Ethernet access point as long as the period that the coaxial terminal does not receive the clock information from the Ethernet access point is shorter than or equal to the period that the coaxial terminal maintains a synchronized clock. Since all the downlink data transmitted by the Ethernet access node contain clock information, in order to guarantee that the period that the coaxial terminal does not receive the clock information from the Ethernet access point is shorter than or equal to the period that the coaxial terminal maintains a synchronized clock, the downlink time slot should be start before the period that the coaxial terminal maintains a synchronized clock expires or the uplink time slot should be ended before the period that the coaxial terminal maintains a synchronized clock expires.

Figure 8:
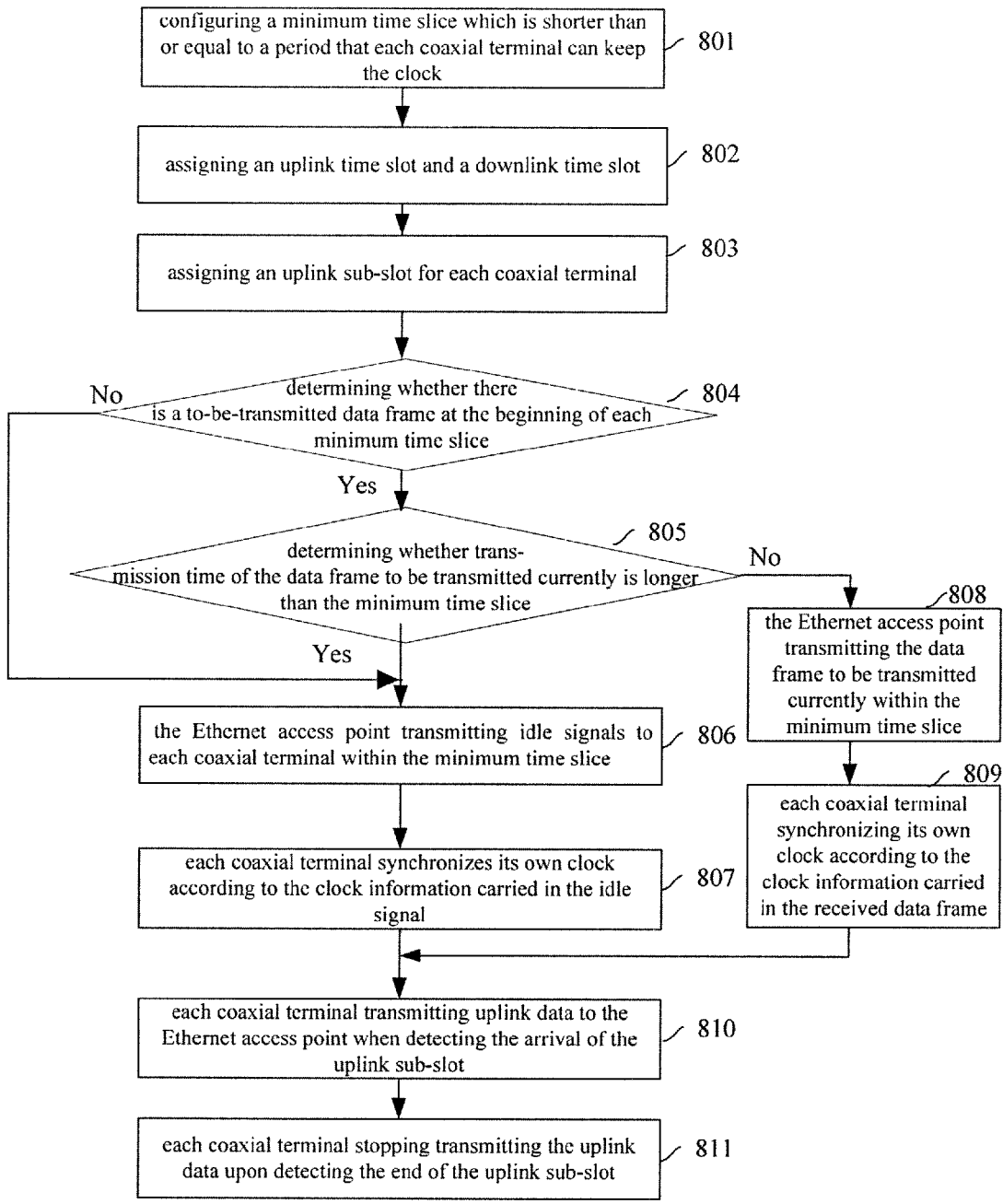

Therefore, in another embodiment of the present invention, the uplink time slot and the downlink time slot are configured based on the period that each coaxial terminal can maintain a synchronized clock, where, each coaxial terminal's uplink sub-slot is configured as being shorter than or equal to the period that each coaxial terminal can maintain a synchronized clock and the length of the downlink time slot are multiples of the period that each coaxial terminal can maintain a synchronized clock. And thus, the uplink time slot and the downlink time slot are configured and the data transmission is performed based on the configured time slots. As shown in FIG. 8, the data transmission includes the following steps:

Step 801: configuring a minimum time slice which is shorter than or equal to a period that each coaxial terminal can maintain a synchronized clock.

Step 802: assigning an uplink time slot and a downlink time slot, where the downlink time slot includes at least one minimum time slice.

Step 803: assigning an uplink sub-slot for each coaxial terminal which is shorter than or equal to the period that each coaxial terminal can maintain a synchronized clock.

Here, the modes of assigning the uplink sub-slot may include:

Mode I: the uplink sub-slot is assigned directly to each coaxial terminal by a manager according to the period that each coaxial terminal can maintain a synchronized clock.

Mode II: the Ethernet access point first acquires each coaxial terminal's period that it can maintain a synchronized clock, and then assigns the uplink sub-slot according to each coaxial terminal's period that it can maintain a synchronized clock, where, the specific method for acquiring the period may be that the manager directly inputs each coaxial terminal's period that it can maintain a synchronized clock or each coaxial terminal transmits to the Ethernet access point information of its own period that it can maintain a synchronized clock.

In Mode II, each coaxial terminal may further report the length of each to-be-transmitted uplink data frame to the Ethernet access point in advance, thereby the Ethernet access point can configure the uplink sub-slot further according to the length of each uplink data frame to be transmitted by each coaxial terminal. That is to say, the Ethernet access point considers both the period that each coaxial terminal can maintain a synchronized clock and the length of each uplink data frame to be transmitted by each coaxial terminal when configuring the uplink sub-slot.

In Mode II, the Ethernet access point further needs to transmit the assigned uplink time slot information to each coaxial terminal through an existing or new added control message transmitted to the coaxial terminals.

In Step 803, specifically, the uplink sub-slot can be configure as long as the minimum time slice configured in Step 801 to implement the object that the uplink sub-slot is shorter than or as long as the period that each coaxial terminal maintains a synchronized clock.

It should be noted that by configuring the downlink time slot and the uplink sub-slot according to the minimum time slice as mentioned in Steps 801 to 803, the downlink time slot is made as a multiple of the uplink sub-slot, which benefits updating the downlink time slot and the uplink sub-slot based on the minimum time slice in subsequent procedures. For example, the minimum time slice may be configured as 5 ms in Step 801 if the period that the coaxial terminal maintains a synchronized clock is as long as 10 ms, and the downlink time slot may be configured as 20 ms in Step 802 and the uplink sub-slot may be configured as 5 ms in Step 803 if the ratio of the downlink time slot to the uplink sub-slot is 4:1.

Step 804: when detecting the arrival of the downlink time slot, the Ethernet access point determining whether there is a to-be-transmitted data frame at the beginning of each minimum time slice in the downlink time slot, performing Step 805 if it is determined that there is a to-be-transmitted data frame, and otherwise, performing Step 806.

Here, the minimum time slice is shorter than or equal to the period that each coaxial terminal maintains a synchronized clock which reflects each coaxial terminal's ability for maintaining a synchronized clock. The downlink time slot may be divided into minimum time slices in order to guarantee that within the downlink time slot, the coaxial terminal is able to receive downlink data from the Ethernet access point before each time the period that the coaxial terminal maintains a synchronized clock expires. That is, the Ethernet access point needs to determine whether there is a to-be-transmitted data frame at each minimum time slice within the downlink time slot, and it needs to perform the subsequent process of transmitting idle signals if it is determined that there is no such data frame, in order to guarantee that the coaxial terminal is able to receive downlink data from the Ethernet access point before each time the period that the coaxial terminal maintains a synchronized clock expires and to synchronize its own clock according to the downlink data.

Step 805: the Ethernet access point determining whether transmission time of the data frame to be transmitted currently is longer than the minimum time slice, performing Step 806 if it is determined that the transmission time is longer than the minimum time slice, and otherwise, performing Step 808.

For the length of the Ethernet data frame is not fixed, the transmission time of one data frame is different from those of other data frames. The Ethernet access point can calculate the transmission time of a data frame according to the length of the data frame. If the transmission time of a data frame is longer than the length of the minimum time slice, transmitting the data frame may occupy the uplink transmission time, that is, the coaxial terminal and the Ethernet access point may occupy a uplink and downlink shared transmission channel simultaneously. As a result, a transmission error of the data may occur. Consequently, in order to guarantee that in any circumstance, data can be accurately transmitted, in this step, before the Ethernet access point transmit a data frame, it is preferred for the Ethernet access point to judge whether the transmission time of the data frame is longer than the minimum time slice. And if the transmission time of the data frame is longer than the minimum time slice, the Ethernet access point will not transmit the data frame. Instead, the Ethernet access point transmits an idle signal to synchronize the coaxial terminals.

Step 806: the Ethernet access point transmitting an idle signal to each coaxial terminal within the minimum time slice.

Step 807: each coaxial terminal synchronizing its own clock according to the clock information carried in the idle signal, and performing Step 810.

Step 808: the Ethernet access point transmitting the data frame to be transmitted currently within the minimum time slice.

Step 809: each coaxial terminal synchronizing its own clock according to the clock information carried in the received data frame.

Step 810: each coaxial terminal transmitting uplink data to the Ethernet access point when detecting the arrival of the uplink sub-slot.

Step 811: each coaxial terminal stopping transmitting the uplink data upon detecting the end of the uplink sub-slot.

According to a data transmission method of the embodiment of the present invention as shown in FIG. 8, the coaxial terminal adapted for implementing the data transmission method includes: a clock management unit, a data interaction processing unit and a clock synchronization unit. Wherein, the clock management unit is adapted for saving information of the uplink sub-slot, and notifying the data interaction processing unit when detecting the arrival or the end of the uplink time slot. The uplink sub-slot is shorter than or equal to the period that the coaxial terminal can keep the clock. The data interaction processing unit is connected with the clock management unit and is adapted for transmitting uplink data to the Ethernet access point upon receiving the notification of the arrival of the uplink time slot and receiving downlink data from the Ethernet access point upon receiving the notification of the end of the uplink time slot. The clock synchronization unit is adapted for synchronizing and updating the clock information saved in the coaxial terminal according to the received clock information. And the data interaction processing unit is adapted for retrieving clock information from downlink data upon receiving the downlink data transmitted from the Ethernet access point, transmitting the retrieved clock information to the clock synchronization unit for the clock information's synchronization and updating, and transmitting the uplink data and receiving the downlink data according to the clock information saved in the clock synchronization unit.

It should be stated that the previous description of the invention and the embodiments is intended to prove the practical application of the technical schemes provided by the invention, which should not be interpreted as the limitation for the protection scope of the invention. Various modifications, equivalent substitute and improvement made by those skilled in this art without departing from the spirit and principle of the invention shall fall into the protection scope of the claims of the invention.

The invention claimed is:

1. A method for transmitting data in a coax network to implement uplink data and downlink data transmission on a same physical transmission channel between an access point and each coaxial terminal in a coax distribution network, comprising:
dividing an entire time duration of a physical transmission channel for transmitting information into time slices, and organizing all the time slices into two time slots, one for uplink data transmission and the other one for downlink data transmission;
obtaining the length of a period that each coaxial terminal maintains a synchronized clock, and dividing the time slot for uplink data transmission into a plurality of uplink sub-slots according to the length;
transmitting, by different coaxial terminals, uplink data to the access point at different uplink sub-slots; and
transmitting, by the access point, downlink data to each coaxial terminal at the time slot for downlink data transmission;
wherein dividing the time slot for uplink data transmission into a plurality of uplink sub-slots according to the length comprises,
obtaining the length of each uplink data frame to be transmitted by each coaxial terminal, and dividing the time slot for uplink data transmission into a plurality of uplink-sub-slots according to the length of the period that each coaxial terminal maintains the synchronized clock and the length of each uplink data frame to be transmitted by each coaxial terminal.

2. The method for transmitting data in the coax network according to claim 1, wherein the length of the uplink sub-slot is shorter than or equal to the length of the period that each coaxial terminal maintains the synchronized clock.

3. The method for transmitting data in the coax network according to claim 1, wherein transmitting, by the access point, downlink data to each coaxial terminal at the time slot for downlink data transmission comprises:
transmitting, by the access point, the downlink data to each coaxial terminal at the time slot for downlink data transmission in a broadcasting mode.

4. The method for transmitting data in the coax network according to claim 1, wherein transmitting, by different coaxial terminals, uplink data to the access point at different uplink sub-slots comprises:
discovering the coaxial terminals and completing on-power registration for each coaxial terminal discovered;
collecting status of all the coaxial terminals that wait for traffic transmission according to uplink bandwidth requests sent from the coaxial terminals, and allocating uplink sub-slots to the coaxial terminals that need to transmit uplink data; and
transmitting, by each coaxial terminal, uplink data to be transmitted to the access point at its respective uplink sub-slots allocated for uplink data transmission.

5. The method for transmitting data in the coax network according to claim 1, wherein Multi-Point Control Protocol (MPCP) control protocol is adopted in the media access control layer of the coaxial terminal for controlling uplink data transmission when the coaxial terminal transmits uplink data to the access point.

6. The method for transmitting data in the coax network according to claim 1, wherein dividing an entire time duration of a physical transmission channel for transmitting information into time slices comprises:
dividing the entire time duration of the physical transmission channel for transmitting information into minimum time slices, wherein the minimum time slices are shorter than or equal to the length of the period that each coaxial terminal maintains the synchronized clock.

7. The method for transmitting data in the coax network according to claim 1, wherein the length of the time slot for downlink data transmission are multiples of the period that each coaxial terminal maintains the synchronized clock.

8. The method for transmitting data in the coax network according to claim 1, wherein the length of the time slot for downlink data transmission and the length of the uplink sub-slots are proportional.

9. The method for transmitting data in the coax network according to claim 1, further comprising:
when the number of the coaxial terminals that are registered in the coax network changes, re-assigning the number of the sub-slots and the length of the sub-slots.

10. A transmission apparatus for transmitting data in a coax network, the coax network including an access point and a plurality of coaxial terminals connected with the access point through splitters, and a same physical transmission channel being configured to transmit uplink data and downlink data between the access point and each of the coaxial terminals in the coax network, comprising:
a network bandwidth allocation module, connected with the access point and each of the coaxial terminals in the coax network;
a configuration module; and
a transmission control module,
wherein the configuration module comprises,
an uplink/downlink time slot allocation module, configured to divide an entire time duration of a physical transmission channel for transmitting information into time slices, organize all the time slices into two time slots, one for uplink data transmission and the other one for downlink data transmission, and
an uplink sub-slot allocation module, configured to obtain the length of a period that each coaxial terminal maintains a synchronized clock, and divide the time slot for uplink data transmission into a plurality of uplink sub-slots according to the length, and
wherein the transmission control module is connected with the configuration module and located between the access point and the plurality of coaxial terminals, and
wherein the transmission control module comprises,
an uplink data transmission control module, configured to make different coaxial terminals transmit uplink data to the access point at different uplink sub-slots, and
a downlink data transmission control module, configured to make the access point transmit downlink data to each coaxial terminal at the time slot for downlink data transmission;

wherein the uplink sub-slot allocation module is configured to obtain the length of each uplink data frame to be transmitted by each coaxial terminal, and to divide the time slot for uplink data transmission into a plurality of uplink sub-slots according to the length of the period that each coaxial terminal maintains the synchronized clock and the length of each uplink data frame to be transmitted by each coaxial terminal.

11. The transmission apparatus according to claim 10, wherein
the downlink data transmission control module is adapted for making the access point transmit downlink data to each coaxial terminal at the time slot for downlink data transmission in a broadcasting mode.

12. The transmission apparatus according to claim 10, wherein the uplink data transmission control module comprises:
a registration module, configured to discover the coaxial terminals and complete on-power registration for each coaxial terminal discovered;
a report processing module, configured to collect the status of all the coaxial terminals that wait for traffic transmission according to uplink bandwidth requests sent from the coaxial terminals, and allocate uplink sub-slots to the coaxial terminals that need to transmit uplink data; and
a transmission processing module, configured to make each coaxial terminal transmit uplink data to be transmitted to the access point at its respective uplink sub-slots allocated for uplink data transmission.

13. The transmission apparatus according to claim 10, wherein the uplink data transmission control module is located in a Media Access Control (MAC) layer chip of the access point and/or each coaxial terminal to make the MAC layer transmit the uplink data from each coaxial terminal to the access point by adopting Multi-Point Control Protocol (MPCP) protocol.

14. The transmission apparatus according to claim 10, wherein the uplink/downlink time slot allocation module is configured to divide the entire time duration of the physical transmission channel for transmitting information into minimum time slices, wherein the minimum time slices are shorter than or equal to the length of the period that each coaxial terminal maintains the synchronized clock.

15. The transmission apparatus according to claim 10, wherein the length of the time slot for downlink data transmission are multiples of the period that each coaxial terminal maintains the synchronized clock.

16. The transmission apparatus according to claim 10, wherein the length of the time slot for downlink data transmission and the length of the uplink sub-slots are proportional.

17. The transmission apparatus according to claim 10, wherein the transmission control module is configured to, when the number of the coaxial terminals that are registered in the coax network changes, re-assigning the number of the sub-slots and the length of the sub-slots.

18. A coax network including an access point and a plurality of coaxial terminals connected with the access point through splitters, a same physical transmission channel being configured to transmit uplink data and downlink data between the access point and each coaxial terminal in the coax network, comprising:
a data transmission apparatus, which includes
a network bandwidth allocation module connected with the access point and each of the coaxial terminals in the coax network, the network bandwidth allocation module comprises,
a configuration module, configured to divide an entire time duration of a physical transmission channel for transmitting information into time slices, organize all the time slices into two time slots, one for uplink data transmission and the other one for downlink data transmission, obtaining the length of a period that each coaxial terminal maintains a synchronized clock, and divide the time slot for uplink data transmission into a plurality of uplink sub-slots according to the length, and
a transmission control module, configured to make different coaxial terminals transmit uplink date to the access point at different uplink sub-slots, and make the access point transmit downlink data to each coaxial terminal at the time slot for downlink data transmission;
wherein the configuration module is configured to obtain the length of each uplink data frame to be transmitted by each coaxial terminal, and divide the time slot for uplink data transmission into a plurality of uplink sub-slots according to the length of the period that each coaxial terminal maintains the synchronized clock and the length of each uplink data frame to be transmitted by each coaxial terminal.

19. The coax network according to claim 18, wherein the configuration module is configured to divide the entire time duration of the physical transmission channel for transmitting information into minimum time slices, wherein the minimum time slices are shorter than or equal to the length of the period that each coaxial terminal maintains the synchronized clock.

20. The coax network according to claim 18, wherein the length of the time slot for downlink data transmission are multiples of the period that each coaxial terminal maintains the synchronized clock.

21. The coax network according to claim 18, wherein the length of the time slot for downlink data transmission and the length of the uplink sub-slots are proportional.

22. The coax network according to claim 18, wherein the transmission control module is configured to, when the number of the coaxial terminals that are registered in the coax network changes, re-assign the number of the sub-slots and the length of the sub-slots.

* * * * *